US009834113B2

(12) United States Patent
Gunnerud et al.

(10) Patent No.: US 9,834,113 B2
(45) Date of Patent: Dec. 5, 2017

(54) BATTERY CHARGING SYSTEM WITH AN ON-BOARD CHARGER

(71) Applicant: E-POWER NORDIC AB, Mölndal (SE)

(72) Inventors: Morten Gunnerud, Mölndal (SE); Ronald Hedström, Mölndal (SE); Mårten Ekström, Mölndal (SE)

(*) Notice: Subject to any disclaimer, the term of this patent is extended or adjusted under 35 U.S.C. 154(b) by 267 days.

(21) Appl. No.: 14/793,799

(22) Filed: Jul. 8, 2015

(65) Prior Publication Data
US 2015/0306973 A1  Oct. 29, 2015

Related U.S. Application Data

(63) Continuation of application No. PCT/SE2014/000004, filed on Jan. 15, 2014.

(60) Provisional application No. 61/752,730, filed on Jan. 15, 2013.

(51) Int. Cl.
*H01M 10/44* (2006.01)
*H01M 10/46* (2006.01)
*B60L 11/18* (2006.01)

(52) U.S. Cl.
CPC ....... *B60L 11/1868* (2013.01); *B60L 11/1811* (2013.01); *B60L 11/1816* (2013.01); *B60L 11/1861* (2013.01); *B60L 2200/10* (2013.01); *B60L 2200/18* (2013.01); *B60L 2200/32* (2013.01); *B60L 2200/36* (2013.01); *B60L 2200/40* (2013.01); *B60L 2210/10* (2013.01); *B60L 2210/30* (2013.01); *Y02T 10/7005* (2013.01); *Y02T 10/7044* (2013.01); *Y02T 10/7066* (2013.01); *Y02T 10/7216* (2013.01); *Y02T 10/7241* (2013.01)

(58) Field of Classification Search
CPC ...... H02J 7/0003; H02J 7/1423; H02J 7/0013; H02J 7/0055; H02J 2007/0059
USPC ................ 320/103, 104, 116, 127, 128, 140
See application file for complete search history.

(56) References Cited

U.S. PATENT DOCUMENTS

| | | | |
|---|---|---|---|
| 8,534,400 B2* | 9/2013 | Stanek | B60L 7/18 180/65.265 |
| 8,618,771 B2* | 12/2013 | Ichikawa | B60L 11/123 320/109 |
| 2004/0055305 A1* | 3/2004 | Kuroda | B60H 1/00735 60/698 |
| 2008/0234897 A1* | 9/2008 | Tsuchida | B62D 5/046 701/42 |
| 2010/0019723 A1 | 1/2010 | Ichikawa | |
| 2011/0168462 A1 | 7/2011 | Stanek et al. | |
| 2011/0273136 A1 | 11/2011 | Yoshimoto | |
| 2012/0049794 A1 | 3/2012 | Han et al. | |
| 2012/0223575 A1 | 9/2012 | Hachiya et al. | |
| 2013/0054069 A1* | 2/2013 | Komiya | B60L 1/003 701/22 |

(Continued)

*Primary Examiner* — Edward Tso
(74) *Attorney, Agent, or Firm* — Gabriela B. Tomescu; Bergenstrahle & Partners AB

(57) ABSTRACT

A battery charging system of a vehicle and method for charging a low-voltage battery from a high-voltage battery or an external power supply are provided, where the battery charging system includes an on-board charger (OBC) to charge the low voltage battery either from the high-voltage battery or from the external power supply, and the OBC is powered either by the low-voltage battery or the external power supply.

12 Claims, 1 Drawing Sheet

(56) References Cited

U.S. PATENT DOCUMENTS

2014/0244082 A1* 8/2014 Caron ............... B60L 11/005
                                                           701/22

* cited by examiner

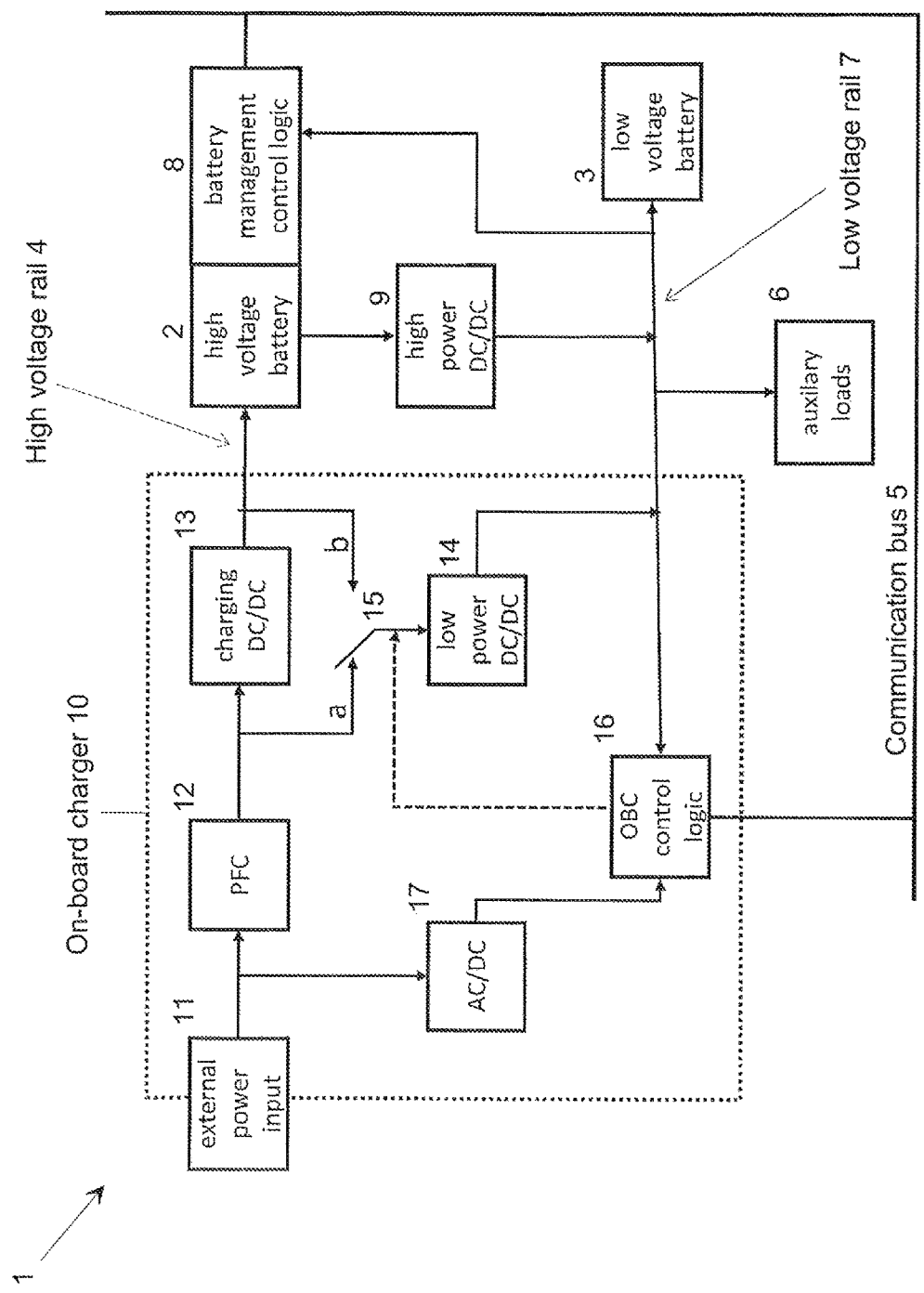

# BATTERY CHARGING SYSTEM WITH AN ON-BOARD CHARGER

This application is a continuation of PCT Application No. PCT/SE2014/000004, filed 15 Jan. 2014, which claims priority to US Provisional Application No. 61/752,730, filed on 15 Jan. 2013, the entire contents of each of which are hereby incorporated by reference.

BACKGROUND

The present invention relates to a battery charging system for use in an electric vehicle having at least a high-voltage battery and a low-voltage battery. In particular, the battery charging system is configured to charge the high-voltage battery via an external power supply, and charge the low-voltage battery either from the high-voltage battery or from the external power supply.

Conventionally, in a plug-in hybrid or electric vehicle, various components are supplied by a standard low voltage of 12 or 24 volts (12V/24V, hereinafter called low-voltage battery). This voltage is generated by a separate DC/DC converter connected to a high voltage power source (e.g., a propulsion battery), where the DC/DC converter converts the high voltage into the 12V or 24V low voltage. In some cases, a separate 12V or 24V generator driven from rotating components of the combustion engine is used.

To provide sufficient power for all low voltage supplied functions to operate in critical situations, the typical output power of such a conventional DC/DC converter is up to 4 kW in a 12V system for passenger car applications, and up to 12-15 kW in a 24V system for commercial or off-highway vehicle applications.

As described herein, in order for a vehicle to charge its high-voltage battery from an external power supply, the vehicle typically includes an on-board charger (OBC). The on-board charger may be adapted to charge the high-voltage battery as quickly and/or efficiently as possible, and to utilize the available power from the external power supply (e.g., a public power grid) while adhering to safety regulations regarding connection of equipment to the public power grid system.

When the vehicle is plugged into the public power grid for a period of time longer than necessary to charge the high-voltage battery, the 12V or 24V battery (low-voltage battery) will be depleted because the control logic controlling the on-board charger and other on-board control and safety functions are powered by the low-voltage battery, for example. Thus, to ensure the charge level of the 12V or 24V low-voltage battery, the DC/DC converter must be active, at least periodically, in order to charge the 12V or 24V low-voltage battery from the high-voltage battery via the DC/DC converter. In addition, to manage the required functions of the charging system, several other components of the vehicle control system must be activated. Activation of these components likely will consume energy from the vehicle high-voltage battery, and thus may consume even more energy from the public power grid to maintain an appropriate charge level, thus reducing total efficiency of the vehicle.

Further, to maintain the charge level of the 12V or 24V low-voltage battery, whether the vehicle on-board charger is plugged into the public power grid or not, the DC/DC converter must be started on a regular basis or at a desired minimum charge level. That is, in order to not deplete the low-voltage battery, the DC/DC converter (which is a high-power DC/DC converter) must be active, at least periodically, such as during charging of the low-voltage battery from the high-voltage battery, at a minimal power level of typically below 10% of the optimal or maximum capacity. The high-power DC/DC converter typically is not designed to provide optimal efficiency at such a low power output. Further, the "idle" current drawn from the high power DC/DC converter logics, and other supporting system components required to be active, may also contribute to a higher overall energy consumption. For at least the reasons described above, the total efficiency of the vehicle may be reduced over its use cycle, and strain may be added to the DC/DC converter, thus potentially reducing its useful life.

One possible solution to the above problems is to include an additional on-board power supply for supplying the control and supervision logic before, during, and after charging, in order to maintain the charge level of the low voltage battery. As the power required to operate the additional on-board power supply can be several hundreds of watts, various requirements, such as for Power Factor Correction (PFC) etc., apply.

U.S. Patent Application Publication US 2011/0273136 to Yoshimoto, which is incorporated by reference herein, discloses an electric vehicle having a charger for charging, from an external AC power supply, a high voltage battery for driving a vehicle, and a small DC/DC converter for charging, from the high-voltage battery, an accessory low-voltage battery for driving accessories. A transformer is used for insulating a high-voltage circuit from a low-voltage circuit. US 2011/0273136 discloses a structure in which three windings (a winding for the high-voltage main battery, a winding for the AC source, and a winding for the low-voltage battery) share a single transformer, and electric power conversion is accomplished by way of a common core. However, a drawback to this approach is that it is complicated to integrate two battery chargers running at different voltages with a common core. Further, no galvanic barrier is provided between the AC main and the low-voltage battery, which is a potential safety concern, and may not satisfy existing safety regulations.

U.S. Patent Application Publication US 2010/0019723 to Ichikawa, which is incorporated by reference herein, discloses a vehicle charge system for charging high-voltage main batteries via a commercial power supply, and a low voltage power generating unit that passively generates low voltage power when coupled to the commercial power supply. In particular, during charging via the commercial power supply, the low voltage power generating unit charges a sub battery, thus enabling a controller to be operated via the sub battery. However, according to US 2010/0019723, in order for the low voltage power generating unit to charge the sub battery, the low voltage power generating unit must be connected to the commercial power supply. Further, when the commercial power supply is connected, both the sub battery and the main batteries are charged.

It would be desirable to provide a battery charging system in which a high-voltage battery is charged from an external power supply, and a low-voltage battery is charged either directly from the external power supply or from the high-voltage battery, and which reduces complexity, improves efficiency, and increases safety as compared to existing battery charging systems.

SUMMARY OF THE INVENTION

A battery charging system of a vehicle, such as an electric vehicle and method for charging a low-voltage battery from a high-voltage battery or an external power supply are provided. Thus, according to a first aspect of the subject invention there is provided a battery charging system for a vehicle, comprising: an on-board charger configured to be connected to an external power supply, the on-board charger including a charging DC/DC converter, a high voltage battery connected to the output of the charging DC/DC converter, the high voltage battery configured to be charged by the on-board charger when connected to the external power supply; a high power DC/DC converter connected to the high voltage battery; and a low voltage battery configured to be charged by the external power supply, the system being characterized by a low power DC/DC converter adapted to operate in a first and a second mode of operation, wherein the low power DC/DC converter in the first mode of operation is connected to an input of the charging DC/DC converter and in the second mode of operation is connected to an output of the charging DC/DC converter; wherein the low voltage battery is configured to be charged by the external power supply via the on-board charger when the low power DC/DC converter is in the first mode of operation, and configured to be charged by the high voltage battery when the low power DC/DC converter is in the second mode of operation.

The battery charging system preferably includes at least a low-power or "second" DC/DC converter, in addition to a first, high-power DC/DC converter that is connected to the high-voltage battery, where the second DC/DC converter is configured to provide power to external loads/consumers (i.e., auxiliary loads) in addition to loads internal to the OBC, where a switchable input preferably is incorporated into the OBC, such that the second DC/DC converter input can be alternated between the external power supply and the in-vehicle high-voltage battery to satisfy optimal load requirements. Thus, it is preferred that the low power DC/DC converter is connected to a switch having a first position for connecting the low power DC/DC converter to an input of the charging DC/DC converter and a second position for connecting the low power DC/DC converter to an output of the charging DC/DC converter; wherein the low voltage battery is configured to be charged by the external power supply via the on-board charger when the switch is in the first position, and configured to be charged by the high voltage battery when the switch is in the second position.

In particular, the second DC/DC converter is connected either to an output side of a power factor correction (PFC) unit (and therefore indirectly to AC voltage supplied by the external power supply), or to a high-voltage rail of the high-voltage battery. Thus, it is preferred that the on-board charger comprises a power factor correction circuit, wherein an input of the power factor correction circuit is connected to an external power input and an output of the power factor correction circuit is connected to the input of the charging DC/DC converter.

Preferably, the output voltage from the PFC unit is a DC voltage, and therefore no additional AC/DC converter has to be provided to supply the DC voltage to feed the second DC/DC converter. The design of the second DC/DC converter (low-power DC/DC converter) can thus be optimized to charge the low-voltage battery and supply low voltage attached components in a more efficient manner than by using the main or first high-voltage DC/DC converter, external of the OBC, at a reduced capacity.

According to the subject invention, a control unit is provided to control operation of the battery charging system, including a high-power system that utilizes the high-voltage battery and a low-power system that utilizes the low-power battery. In particular, the second DC/DC converter may be operated such that, when the vehicle is connected to the external power supply and the high-voltage battery is not needed, the control unit turns off the high-power system, and the second DC/DC converter is switched to the PFC unit. Thereby, the low-voltage battery and/or the auxiliary loads can be powered via the external power supply without having to power the high-power system or drain the high-voltage battery. Alternatively or when not connected to external power, the low-power DC/DC converter can be connected to the high-voltage battery, which can be used to charge the low-voltage battery. Further, auxiliary loads can be supplied with energy originating from the high-voltage battery if external power is not available.

The OBC preferably includes at least a control unit that incorporates electronics control logic (hardware and software) which senses the high and low voltages in the vehicle, and also the status of the external power input. The control logic may be embodied as non-transitory computer readable media on a computer readable recording medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In particular, the control logic of the on-board charger receives power from the external power supply, via a separate AC/DC converter (rectifier), and from the low-voltage battery so to be able to use external power when available and energy from the low voltage battery otherwise. The AC/DC converter may be small and efficiently adapted to serve the control unit only, for example. The supply from the external power supply is especially advantageous when both batteries (i.e., the high-voltage battery and the low-voltage battery) are empty to such a degree that the control unit cannot be powered by the almost empty batteries as a power source. As a result, it will still be possible to start up the vehicle when an external power supply is available.

For example, the battery charging system is operable in at least the following two stages. In a first stage (when both batteries are almost empty), the control unit (powered by the external power supply) can be controlled to provide energy to the low-voltage supplied high-voltage battery management control logic to start the charging process of the high voltage battery, as opposed to when the low-voltage battery is drained and thus there is no power available for the control logic. In a second stage, the control unit can then, for a period of time, switch to charge the low-voltage battery from the high voltage rail and the low-power DC/DC converter. By the above operation, it also can be assured that the low-voltage battery is not drained when the vehicle is coupled to a charging station for a long period of time and when, for example, a starter circuit of the vehicle is coupled to the low-voltage battery.

The subject invention as described herein can contribute to the safety of a battery charging system incorporating an OBC, since the high-voltage components of the OBC can be shut off when not needed, and where the low-voltage supplied control logic for high voltage components can be made available when connected to external power, even when the high voltage battery is drained.

Further, according to the subject invention, it is possible to share an external power supply interface, filtering and PFC circuitry between the high power high-voltage charger and the low power low-voltage supply so as to charge the low-voltage battery and/or to run the loads connected thereto directly from the external power supply without activating the high-power DC/DC converter. Safety may be further enhanced since the high-voltage components can be shut off and the high voltage rail kept passive when high voltages are not needed.

According to a second aspect of the subject invention there is provided a method for operating an on-board charger of a vehicle, comprising the steps of: providing an on-board charger including a charging DC/DC converter and a low power DC/DC converter adapted to operate in a first and a second mode of operation; providing a high voltage battery connected to the output of the charging DC/DC converter, a high power DC/DC converter connected to the high voltage battery, and a low voltage battery; connecting the on-board charger to an external power supply so as to charge the high voltage battery and the low voltage battery, the low voltage battery being charged when the low power DC/DC converter operates in the first mode of operation; and disconnecting the on-board charger circuit from the external power supply, wherein the low voltage battery is configured to be charged by the high voltage battery when the low power DC/DC converter operates in the second mode of operation.

Additionally, it is understood that the method of the subject invention may be executed by at least one controller, for example, the control unit as described herein. The term controller refers to a hardware device that includes a memory and a processor. The memory is configured to store the modules and the processor is specifically configured to execute said modules to perform one or more methods which are described further below.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing FIGURES wherein like reference character denote corresponding parts throughout the several views and wherein:

FIG. 1 is a schematic block diagram of a battery charging system including an on-board charger (OBC) circuit according to the subject invention.

DEFINITIONS

The subject invention is most clearly understood with reference to the following definitions:

As used in the specification and claims, the singular form "a", "an" and "the" include plural references unless the context clearly dictates otherwise. For example, it is noted that a plurality of high-voltage batteries may be provided in an electric vehicle according to the subject invention, although the term "a" or "the" high-voltage battery is used throughout the present application.

Also, it will be understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

It will be further understood that the term "vehicle" or similar term as used herein includes motor vehicles such as sports utility vehicles (SUV), buses, trucks, commercial vehicles, watercraft including boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

DETAILED DESCRIPTION OF THE INVENTION

Referring to FIG. 1, a block diagram of a battery charging system, generally designated 1, including an on-board charger (OBC) 10 is depicted according to the subject invention. As shown in FIG. 1, various components of the OBC 10 are encircled by a dotted line, thereby separating the OBC 10 from other components of the battery charging system 1. The battery charging system preferably includes at least a high-voltage battery 2, a low-voltage battery 3, and an external power input 11 that can be coupled to an external power supply (e.g., a public power grid, not shown) for charging the high-voltage battery 2 and/or the low-voltage battery 3, where the external power input 11 may be part of the OBC As shown in FIG. 1, an input of the external power input 11 is configured to be connected to an external power supply, and an output of the external power input 11, i.e., an AC connection, is connected to a power factor correction (PFC) circuit 12. The PFC circuit 12 is adapted to adjust the power factor of the output to improve efficiency of the system, as is well known by the person of ordinary skill in the art. The PFC circuit 12 comprises a rectifier to convert the AC voltage from the external power input into a DC voltage. The output from the PFC circuit 12 is a DC voltage (high voltage) which is fed to the input of a charging DC/DC converter 13 for converting the high voltage from the PFC circuit 12 into a high voltage which corresponds to the DC high voltage required to cause current to flow into the high-voltage battery 2.

As further shown in FIG. 1, a "second" DC/DC converter (low-power DC/DC converter) 14 is integrated into the battery charging system. The low-power DC/DC converter 14 is also referred to herein as the "second" DC/DC converter to distinguish from a "first" or high-power DC/DC converter used to supply DC power to the high-voltage battery 2. The second DC/DC converter 14 can be connected, for example, via a switch 15, either to a first position (a) at the output side of the PFC 12 or to a second position (b) at the input side of the high-voltage battery 2 via a high-voltage rail 4. In particular, if the switch 15 is closed such that the low-power DC/DC converter 14 is connected to the PFC 12, the low-power DC/DC converter 14 would be coupled to the external power input 11, and thus to the external power supply. The switch 15 can be controlled by control logic 16 as depicted by the dashed line. It will be understood by one of ordinary skill in the art that it is possible to carry out the function of the switch 15 by one or more switches, or circuit solutions, so as to alternate the energy source for the low power DC/DC converter 14 between (1) the PFC 12, and (2) the high-voltage rail and the high-voltage battery 2. As described above, the output voltage from the PFC 12 preferably is a DC voltage, and therefore no additional AC/DC converter is required between the external power supply and the low-power DC/DC converter 14 in order to supply a DC voltage to the second DC/DC converter 14.

Thus, according to the subject invention, the number of components required for the battery charger system can be reduced. Further, the architecture of the second low-power DC/DC converter 14 can be optimized to supply the internal low voltage control logic 16, charge the low-voltage battery 3, and provide power to optional auxiliary loads 14 and other low voltage supply logic 8, in the most efficient manner.

In operation, when the vehicle is connected to an external power supply, the external power input 11 is connected to the external power supply (e.g., a public AC power grid having 1-3 phases and a voltage of 380 volts, 220 volts, or 110 volts, for example). The AC high-voltage is fed from the external power input 11 to the PFC 12, where the DC voltage output from the PFC 12 is regulated in the high-voltage charging DC/DC 13 and fed to the high-voltage battery 2 for charging the high-voltage battery 2. Necessary synchronization between the high-voltage charging DC/DC 13 and the high voltage battery 2 is handled over a communication bus 5, e.g., to manage charge levels and on/off conditions.

If the vehicle remains connected to the external power supply via the external power input 11 but charging of the high voltage battery 2 is not desired, the high voltage battery 2 can be internally disabled and the switch 15 be set to the (a) position. Thereby, the low-voltage battery 3 and/or the auxiliary loads 14 (e.g. lights, ventilation, etc.) can be powered from the external power supply (i.e. the external power input 11 via the PFC 12 and the low-power DC/DC converter 14) without having to power/operate the high-power system, and without draining power from the high-voltage battery 2. This is an important feature in case the battery charging system is connected to the public power grid for a longer period of time than necessary to charge the high-voltage battery 2 (e.g., several days).

On the other hand, if the external power input 11 is disconnected or otherwise disabled by a timer, for example, the switch 15 is set to the (b) position and continues to provide power to the low-voltage battery 3 from the high voltage battery 2 via a low voltage rail 7 through the low power DC/DC converter 14 without having to engage a less efficient, high power DC/DC converter 16. Therefore, in-vehicle low power supplied functions are available in an energy-efficient way because of the optimized design of the low power DC/DC converter 14 and the OBC.

As shown, the OBC includes the control logic 16 being connected to the switch 15. The control logic 16 is further connected to the input side of the on-board charger thus receiving power from the external power supply via the external power input 11. That is, the control unit 16 is connected, via an AC/DC converter 17 (rectifier), to the external power input 11. The control logic 16 is also supplied from the low-voltage rail, such that the AC/DC converter 17 can be small and efficiently adapted to serve the control logic 16 only. Thus, a control unit that supplies the control logic 16 can be powered from the low-voltage battery 3 or from the external power supply via the AC/DC converter 17 whenever it is available. The supply from the external power supply (i.e., via the external power input 11) is especially advantageous when both batteries (the high-voltage battery 2 and the low-voltage battery 3) are empty to such a degree that the OBC control logic (or control unit) 16 cannot be powered by the almost empty batteries as a power source.

For example, the battery charging system is operable in at least the following two stages. In a first stage (when both batteries are almost empty), the control logic 16 (powered by the external power supply 11) can provide energy to a low-voltage supplied high-voltage battery management control logic 8 to enable a charging process of the high-voltage battery 2, as opposed to when the low-voltage battery 3 is drained and thus there is no power available for the control logic 16. In a second stage, the control logic 16 can then, for a period of time, switch to charge the low-voltage battery 3 from the high voltage rail and the low-power DC/DC converter 14. By the above operation, it also can be assured that the low-voltage battery 3 is not drained when the vehicle is not driven and connected to an external power supply (e.g., a charging station) for a long period of time and when, for example, a starter circuit of the vehicle is coupled to the low-voltage battery.

According to a further operation, when the vehicle is being driven, upon failure of the high power DC/DC converter 16, the system could be controlled so as to run critical auxiliary loads (e.g., lights) in an emergency mode ensuring they are fed energy by at least periodically connect low-power DC/DC converter 14 to the high-voltage rail and high voltage battery 2.

According to yet a further operation, when auxiliary loads, such as radios, are in use at a vehicle stand still, the high power DC/DC converter 16 does not have to be activated since the low-power DC/DC converter 14 can be directly connected to the high-voltage rail and the high-voltage battery 2 and/or directly to the external grid during charging without activating the high-power system components via the PFC 12.

Although preferred embodiments of the invention have been described using specific terms, such description is for illustrative purposes only, and it is to be understood that changes and variations may be made without departing from the spirit or scope of the following claims. Thus, although a switch is described as the means of switching between the operation of the external power input and the high voltage rail, it will be realized that the term "switch" should be interpreted broadly, including any means that switches the operation between these two modes.

The invention claimed is:

1. A battery charging system for a vehicle, comprising:
an on-board charger configured to be connected to an external power supply, the on-board charger including a charging DC/DC converter,
a high voltage battery connected to an output of the charging DC/DC converter, the high voltage battery configured to be charged by the on-board charger when connected to the external power supply;
a high power DC/DC converter connected to the high voltage battery;
a low voltage battery configured to be charged by the external power supply; and
a low power DC/DC converter adapted to operate in a first and a second mode of operation, wherein the low power DC/DC converter in the first mode of operation is connected to an input of the charging DC/DC converter and in the second mode of operation is connected to the output of the charging DC/DC converter;
wherein the low voltage battery is configured to be charged by the external power supply via the on-board charger when the low power DC/DC converter is in the first mode of operation, and configured to be charged by the high voltage battery when the low power DC/DC converter is in the second mode of operation.

2. The battery charging system of claim 1, wherein the on-board charger comprises a power factor correction circuit, wherein an input of the power factor correction circuit is connected to an external power input and an output of the power factor correction circuit is connected to the input of the charging DC/DC converter.

3. The battery charging system of claim 1, wherein the low power DC/DC converter is connected to a switch having a first position for connecting the low power DC/DC converter to the input of the charging DC/DC converter and a second position for connecting the low power DC/DC converter to the output of the charging DC/DC converter;
    wherein the low voltage battery is configured to be charged by the external power supply via the on-board charger when the switch is in the first position, and configured to be charged by the high voltage battery when the switch is in the second position.

4. The battery charging system of claim 3, wherein the on-board charger further comprises a control unit for providing control logic to control the switch.

5. The battery charging system of claim 4, wherein the on-board charger further comprises an AC/DC converter for supplying DC voltage to the control unit.

6. The battery charging system of claim 1, wherein the on-board charger further comprises an external power input having its input adapted to be connected to the external power supply.

7. The battery charging system of claim 6, wherein the on-board charger circuit further comprises a power factor correction circuit having its input connected to the external power input and its output connected to the input of the charging DC/DC converter.

8. The battery charging system of claim 4, wherein the control unit supplies the control logic to power a battery management control logic unit.

9. The battery charging system of claim 1, wherein the battery charging system is installed in a plug-in hybrid or electric vehicle.

10. The battery charging system of claim 3, wherein the low power DC/DC converter is directly connected to the output of the power factor correction circuit.

11. A method for operating an on-board charger of a vehicle, comprising the steps of:
    providing an on-board charger including a charging DC/DC converter and a low power DC/DC converter adapted to operate in a first and a second mode of operation;
    providing a high voltage battery connected to an output of the charging DC/DC converter, a high power DC/DC converter connected to the high voltage battery, and a low voltage battery;
    connecting the on-board charger to an external power supply so as to charge the high voltage battery and the low voltage battery, the low voltage battery being charged when the low power DC/DC converter operates in the first mode of operation; and
    disconnecting the on-board charger circuit from the external power supply, wherein the low voltage battery is configured to be charged by the high voltage battery when the low power DC/DC converter operates in the second mode of operation.

12. The method for operating an on-board charger of a vehicle according to claim 11, comprising the step of connecting the low power DC/DC converter to a switch having a first position for connecting the low power DC/DC converter to an input of the charging DC/DC converter in the first mode of operation and a second position for connecting the low power DC/DC converter to the output of the charging DC/DC converter in the second mode of operation.

* * * * *